Figure 3:
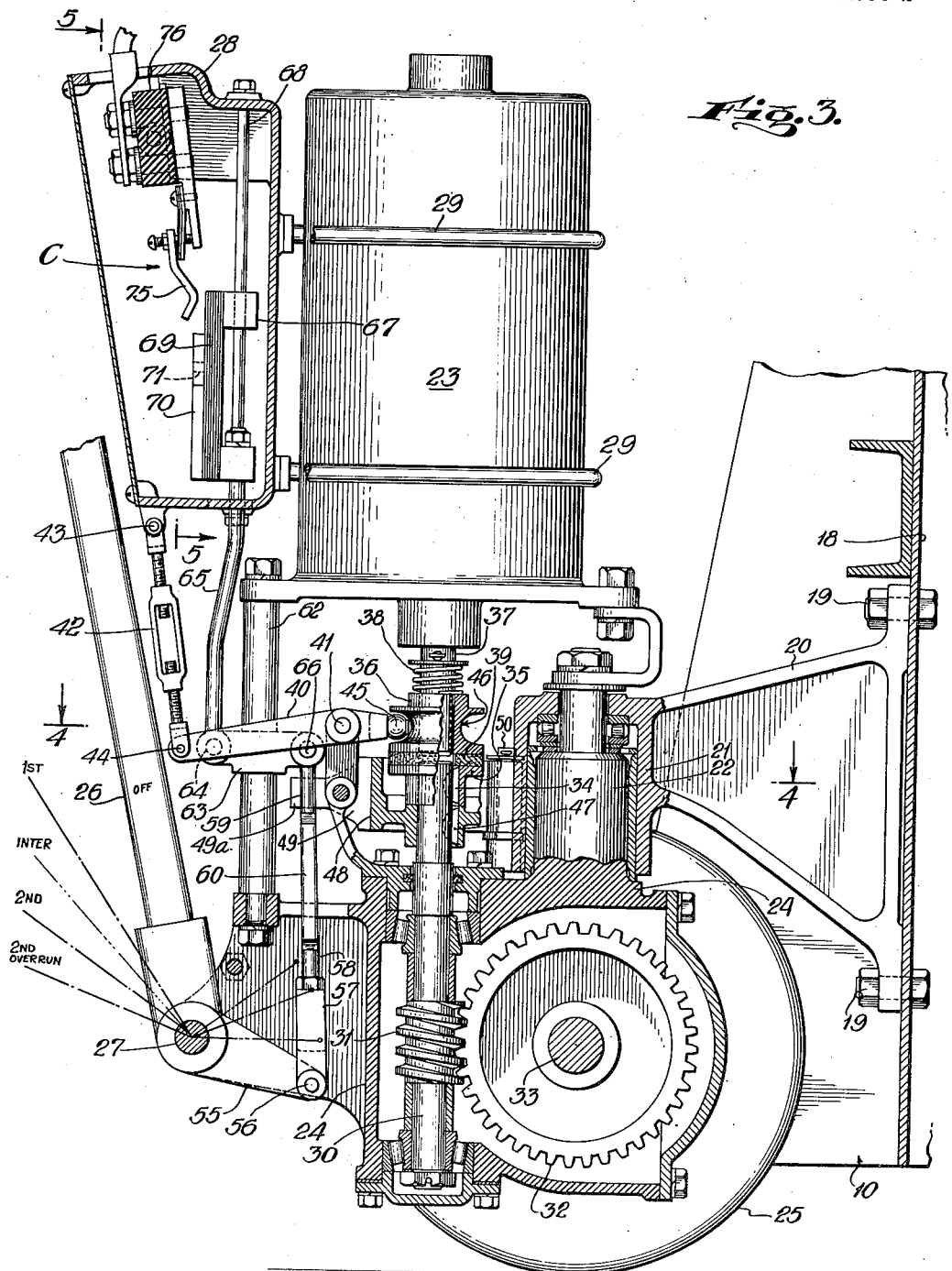

Aug. 24, 1943.  H. J. FRAMHEIN  2,327,583
MOTORIZED LIFT TRUCK
Filed April 29, 1941  6 Sheets-Sheet 1
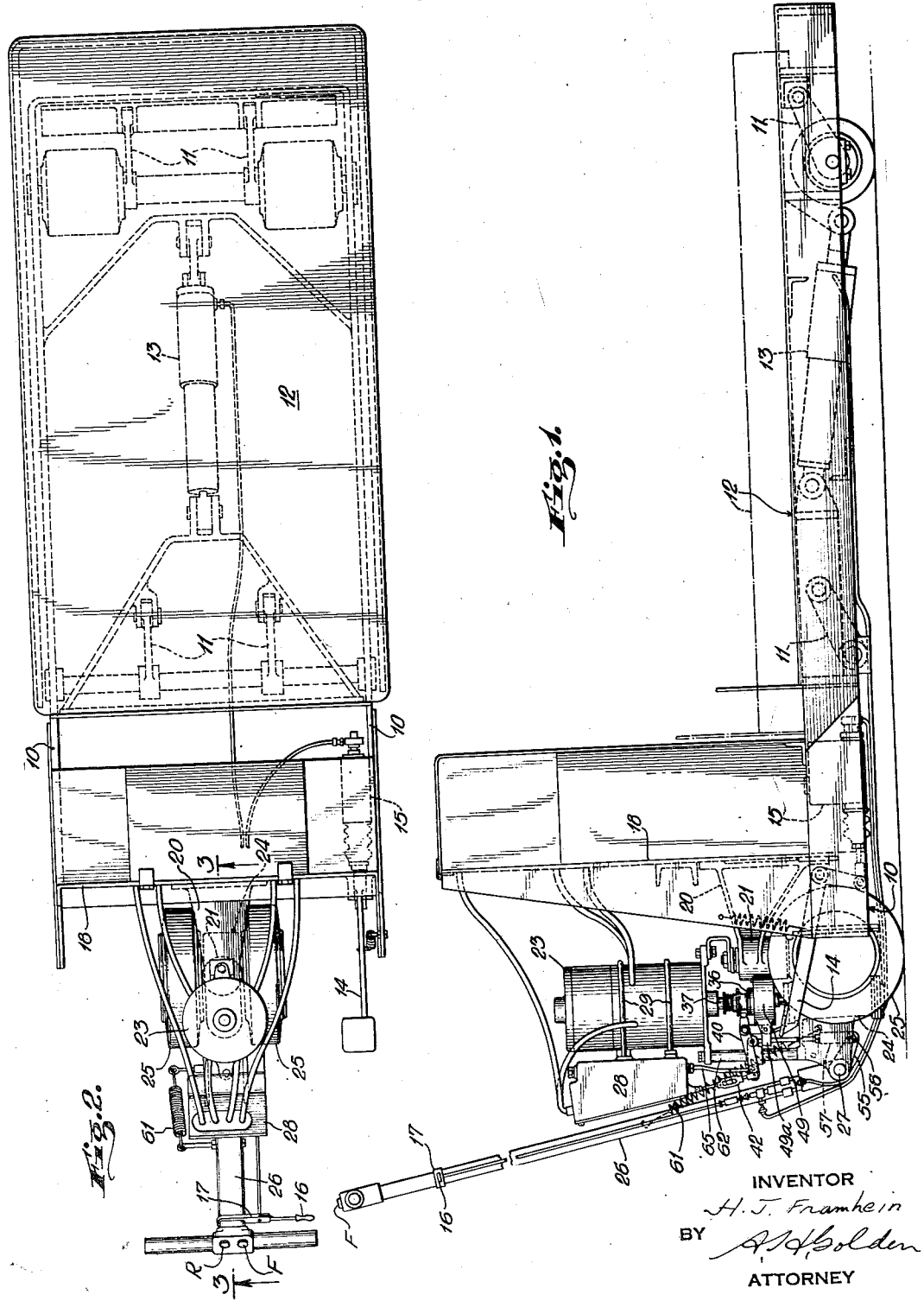
INVENTOR
H. J. Framhein
BY
A. H. Golden
ATTORNEY Aug. 24, 1943.　　　H. J. FRAMHEIN　　　2,327,583
MOTORIZED LIFT TRUCK
Filed April 29, 1941　　　　6 Sheets-Sheet 2

INVENTOR
H. J. Framhein
BY
ATTORNEY

Aug. 24, 1943.　　　H. J. FRAMHEIN　　　2,327,583
MOTORIZED LIFT TRUCK
Filed April 29, 1941　　　6 Sheets-Sheet 3
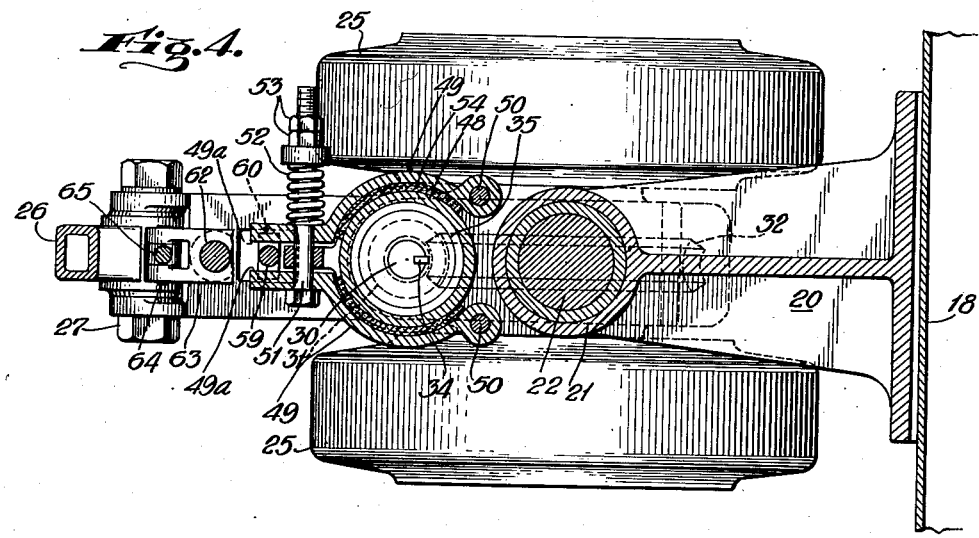
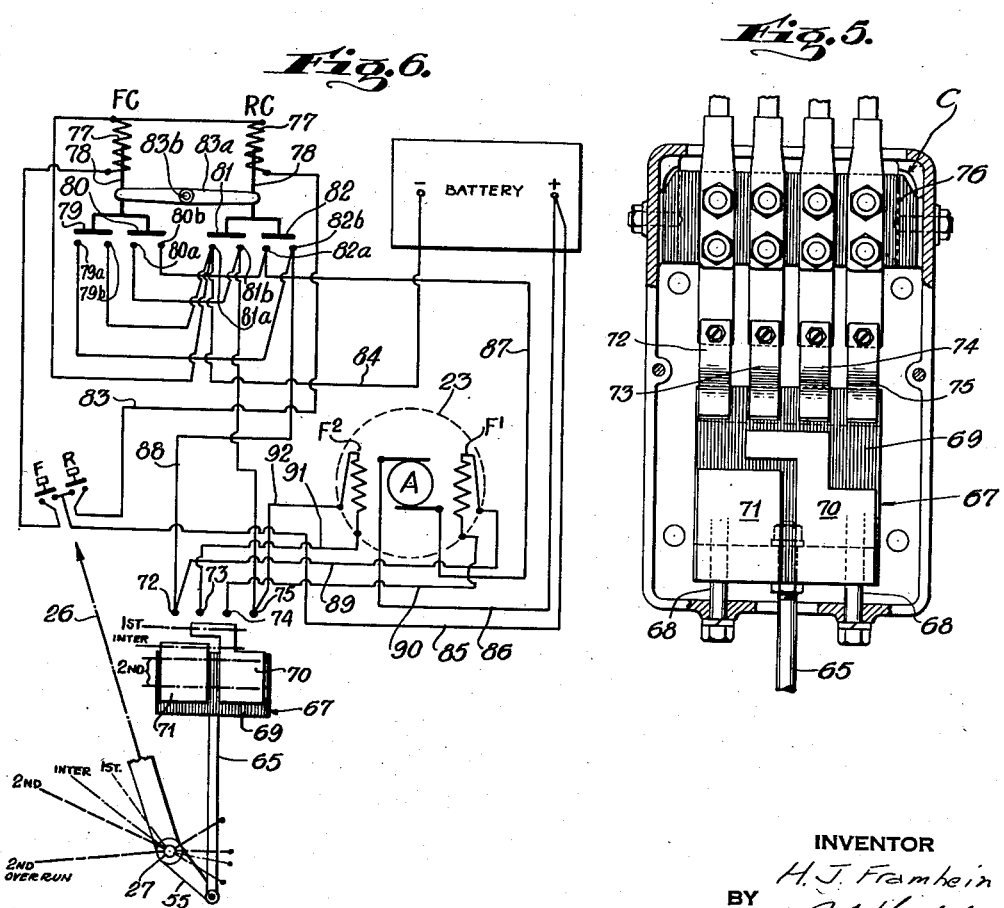
INVENTOR
H. J. Framhein
BY
ATTORNEY Aug. 24, 1943.　　　H. J. FRAMHEIN　　　2,327,583
MOTORIZED LIFT TRUCK
Filed April 29, 1941　　　6 Sheets-Sheet 4

INVENTOR
H. J. Framhein
BY
A. H. Golden
ATTORNEY

Aug. 24, 1943.  H. J. FRAMHEIN  2,327,583
MOTORIZED LIFT TRUCK
Filed April 29, 1941  6 Sheets-Sheet 5
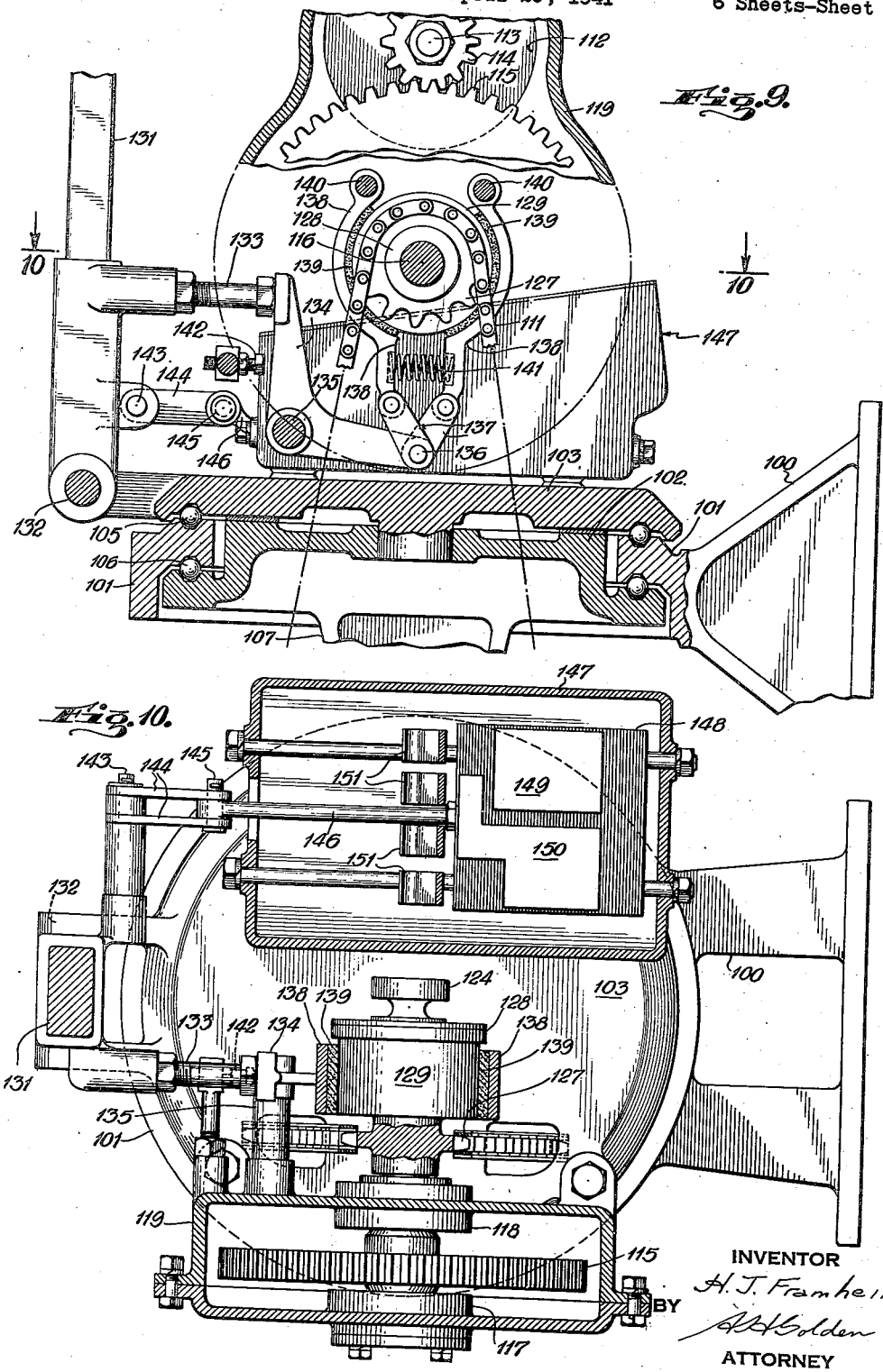
INVENTOR
H. J. Framhein
BY
ATTORNEY

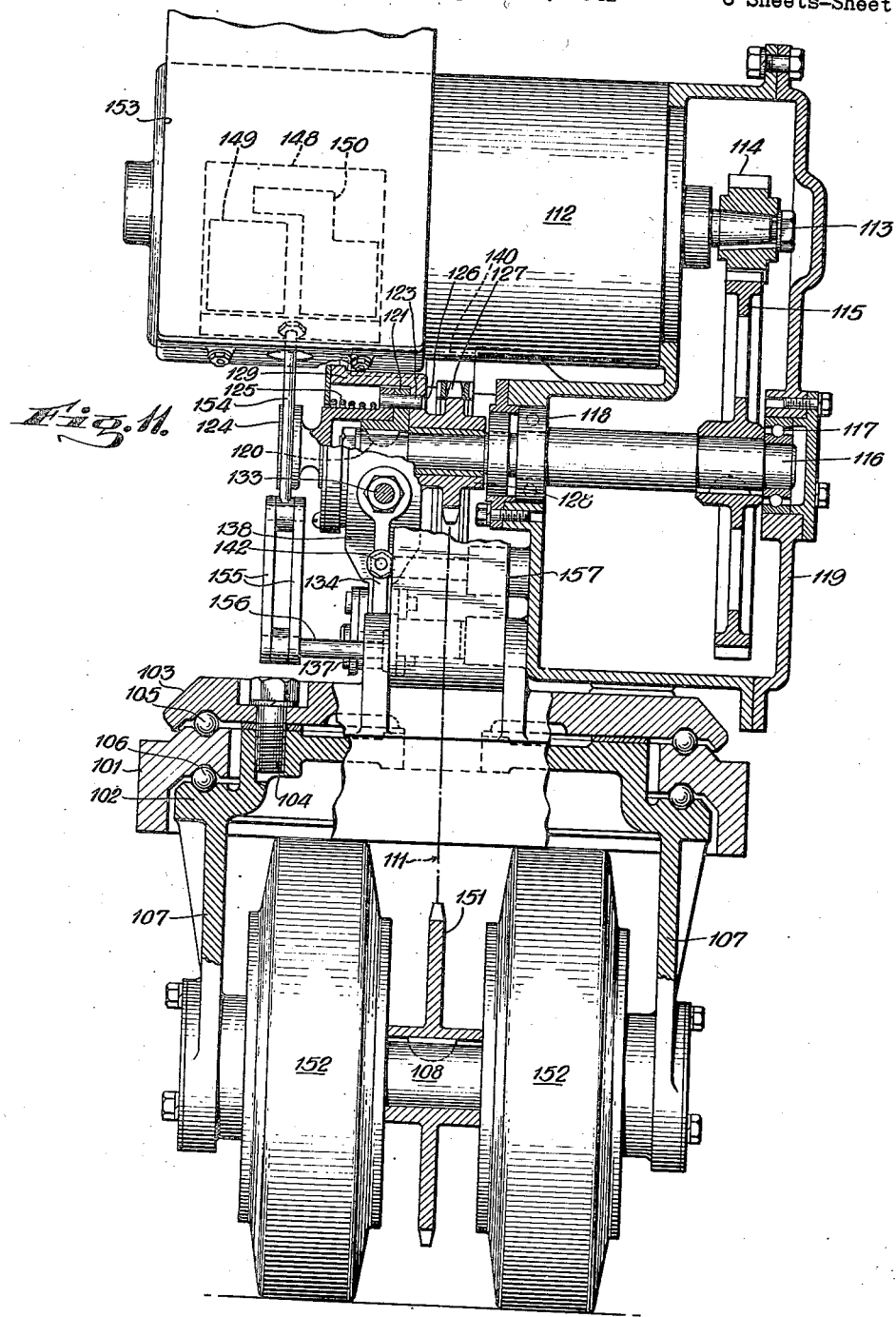

Patented Aug. 24, 1943

2,327,583

UNITED STATES PATENT OFFICE 2,327,583

MOTORIZED LIFT TRUCK

Herbert J. Framhein, Chicago, Ill., assignor to The Yale & Towne Manufacturing Company, Stamford, Conn., a corporation of Connecticut Application April 29, 1941, Serial No. 390,931

24 Claims. (Cl. 180—19)

This invention relates to a lift truck of the type having an elevating platform whereby to lift and transport a loaded pallet or skid. Lift trucks of this type are old and well known in the art, being usually equipped with mechanical or hydraulic mechanisms for lifting a skid or pallet, manual power being relied upon for then pulling the truck.

Because of the increased efficiency of lifting mechanisms which have been developed in recent years, increasingly heavy loads are being handled by trucks of the class described, and the tendency in industry is to increase the loads. It has become increasingly apparent, however, that the trucks may not readily be moved manually from one location to another due to the weight of the loads, especially where the terrain over which the loads are moved is rough, or where the trucks are to be moved up a grade.

It has been suggested, in view of this development of the art, that trucks of the particular class be equipped with power traction means, so that when the load is elevated by mechanical or hydraulic means, the operator may control the traction mechanism of the truck and direct the movement of the truck to any desired location. My invention relates more particularly to a truck of this class, that is, a truck in which a traction motor actuates a traction unit for propelling the truck, with the traction motor controlled by the operator through means of the steering handle of the truck. The control mechanism which I have devised utilizes the vertical swinging movement of the truck steering handle for moving a controller, through which the speed circuits of the traction motor are opened and closed. In practice, I find it desirable to utilize three speeds in a truck of the class described, one speed being preferably transitional.

As a further feature of my invention, I have provided what may be termed directional contactor circuits whereby the direction of movement of the truck may be suitably determined, and whereby the closing of the several speed circuits may be readily controlled by the operator without requiring him to move the steering handle. Preferably, the contactor circuits are controlled by manually depressed switches on the steering handle of the truck, and one of the switches must be closed as a requisite to the closing of a speed circuit through the controller by the vertical swinging movement of the steering handle.

As a further feature of my invention, I have provided a brake for the traction wheel or wheels of my truck, which is applied preferably by the swinging movement of the handle in moving the controller into neutral position. As a further feature of the invention, the brake mechanism is in the form of a drum and brake shoes, suitably mounted between the motor and the traction wheels so as to operate most efficiently.

As still a further feature of the invention, I have provided a clutch mechanism between the traction motor and the traction wheels, and located preferably between the motor and that portion of the traction mechanism which carries the brake drum, so that should the clutch be actuated to separate the motor from the traction wheels, it will leave the brake mechanism in operating relation to the traction wheels, so that it may be applied nevertheless. This conception of a clutch mechanism and its operation is exceedingly important, since through its utilization, the motor may be separated from the traction wheels when the battery which is used preferably to furnish power to the motor, is discharged.

Preferred forms of the means which I have devised are shown in the accompanying drawings, and will be described in this specification, but it should be understood that I consider my invention to be a relatively broad one, and that I expect to obtain claims which will prevent the utilization of my contribution to the art in physical forms other than those herein shown and described. Also, while in describing one form of my invention I shall particularly point out what I now believe is the theory of operation thereof, I do not intend my invention to be limited in scope by that theory.

Figure 7:
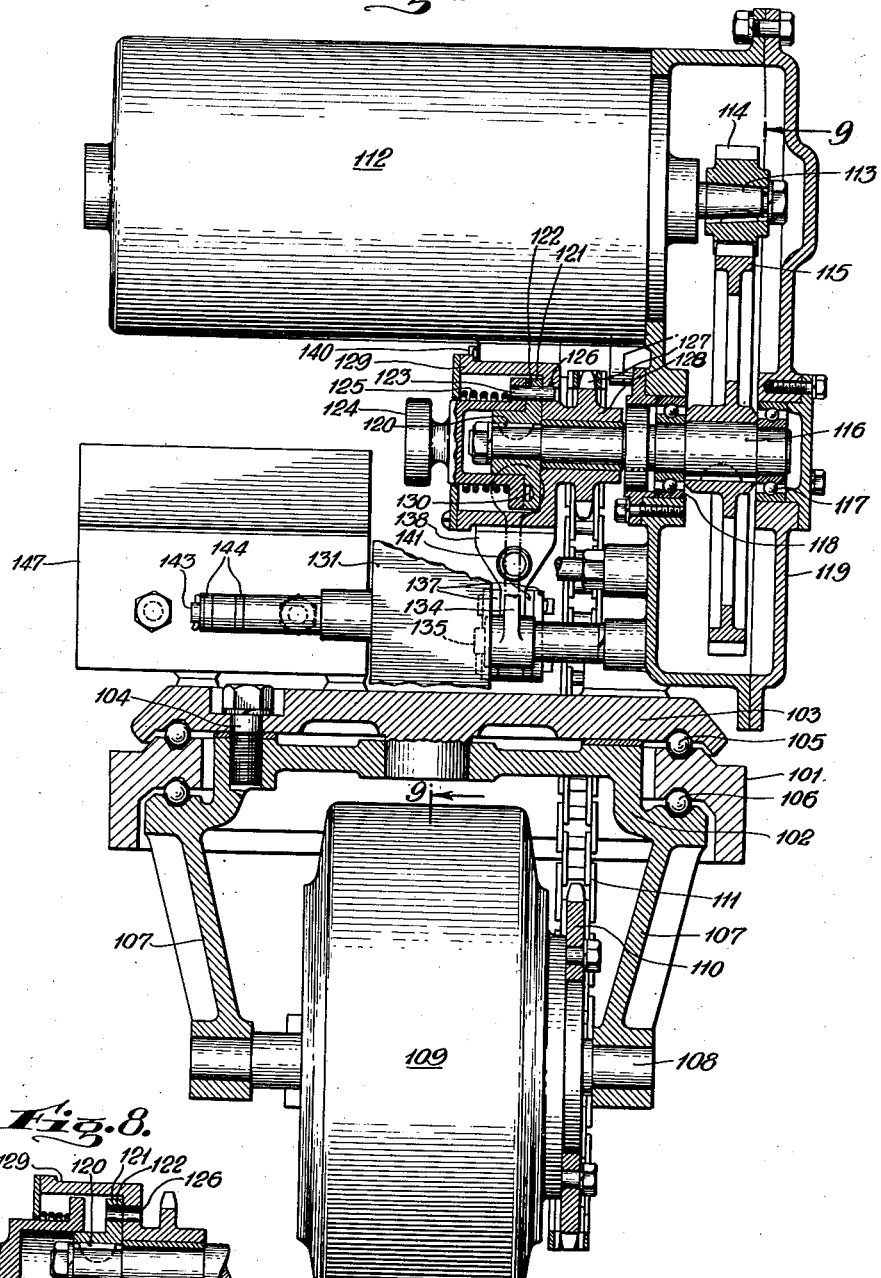
Figure 8:
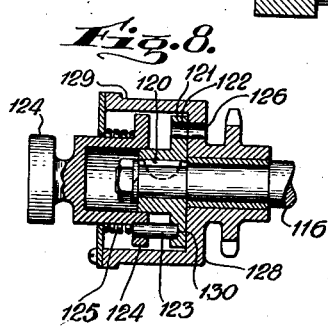

Referring now to the drawings, Fig. 1 is a vertical side view of one form of truck embodying my invention. Fig. 2 is a plan view of the truck of Fig. 1. Fig. 3 is a section of Fig. 2 taken along lines 3—3 of Fig. 2. Fig. 4 is a section taken along lines 4—4 of Fig. 3, while Fig. 5 is a section taken along lines 5—5 of Fig. 3. Fig. 6 is a wiring diagram of the traction circuits of the truck of my invention. Fig. 7 is a sectional view through a portion of a modified form of truck. Fig. 8 is a view of the clutch mechanism shown in Fig. 7 but in a different operating relationship. Fig. 9 is a section of Fig. 7 taken along lines 9—9. Fig. 10 is a section taken along lines 10—10 of Fig. 9. Fig. 11 is a view similar to Fig. 7 but showing a modified form of wheel mechanism, and illustrating also a different operating position of the controller.

Referring now more particularly to Figs. 1, 2 and 3, the main frame of my truck is designated by reference numeral 10 and has pivoted thereto through suitable links 11 an elevating platform 12. This elevating platform may be lifted from the full line position of Fig. 1 to the dash and dot position of Fig. 1 through the intermediary of a hydraulic mechanism 13 which is suitably actuated by a foot pedal 14 through means of a master cylinder 15 in a manner which will be well understood by those skilled in the art. Since the means whereby the elevating platform is operated form no part of this invention, and since the art shows a considerable number of hydraulic and mechanical mechanisms well adapted for the particular purpose, I deem it undesirable to venture into further detail regarding this part of my truck. It may be well, however, to indicate that I prefer to control the lowering of the load through a valve operating lever 16 pivoted on a steering handle bracket 17, and effective through certain valve mechanisms which need not be shown or described.

The front end of the main frame of the truck is best illustrated with reference to Figs. 1 and 3, wherein it will be noted that forming a part of the main frame 10 is a standard 18 on which may be mounted a battery for supplying energy to the traction motor. Secured as through a series of bolts 19 to the standard 18, is a bracket 20 formed integrally with a bearing sleeve 21 relatively to which rotates the bearing post 22 of what I choose to call a steering head. Steering heads of trucks of the particular class, not utilizing power driving mechanism, usually embody a steering wheel and a steering lever.

In my truck, the steering head embodies a traction motor, designated by reference numeral 23, a gear casing designated by reference numeral 24, a pair of steering and traction wheels 25, and a steering lever 26 pivoted at 27 to the steering head. In addition, there is a controller C suitably mounted within a casing 28 secured to the casing of the motor 23 through bands 29. The base plate of gear casing 24 may be formed integrally with the post 22, and mounted for rotation within the casing is a worm shaft 30. The worm 31 of said shaft 30 is in driving engagement with a gear 32 which is suitably secured to the shaft 33 to which the wheels 25 are keyed. The worm shaft 30 has keyed to its upper end at 34, the lower half 35 of a friction clutch. The upper half of the clutch, designated by reference numeral 36, is slidably mounted on the shaft 37 of the motor and is spring pressed by the spring 38 toward the clutch portion 35, it being adapted to engage that clutch portion through the intermediary of a friction disk 39.

A lever 40 is pivoted at 41 for movement by the operation of a turnbuckle 42, one end of which is pivoted at 43 to the controller casing 28, the other end at 44 to the lever 40. One end of the lever 40 is in the form of a ball 45 which rides in a groove 46 of the movable clutch portion 36, so that when rotary movement of the turnbuckle moves the lever 40, the ball portion 45 thereof will move the clutch portion 36 away from engagement with the clutch portion 35. In this way, driving connection between the motor 23 and the traction wheels 25 is readily made and broken. Those skilled in the art will readily appreciate the advantage of this feature in that it makes it possible to disengage the motor from the traction wheels, should the battery which furnishes energy to the motor be discharged.

Keyed also to the worm shaft 30 at 47 is a brake drum 48, and cooperating with this brake drum are a pair of brake shoes 49 pivoted at 50 relatively to the gear casing. These brake shoes cooperate with a bolt 51, as best seen in Fig. 4, whereby a spring 52 mounted on the bolt and adjustable by a pair of nuts 53, may readily determine the pressure with which the brake shoes are urged against the brake drum 48, a suitable brake lining 54 being provided, as will be appreciated by those skilled in the art. It will now be understood that normally the brake shoes will be applied to the brake drum 48 by the pressure of spring 52, and that to release the brake shoes from the brake drum, it is necessary to separate the brake shoes 49. Before proceeding with a description of the means whereby the brake shoes are separated, it will be well to indicate that the brake drum 48, being keyed to the worm shaft 30, is always in a position to control the traction wheels 25, regardless of whether or not the clutch portions 35 and 36 are in engagement. This is an exceedingly important feature of my invention, as will be understood by those skilled in the art.

The steering handle 26, which has been described as pivoted at 27 to the steering head, is utilized for moving the brake shoes 49 away from the brake drum 48. This action is accomplished by the steering handle 26 through the intermediary of its lever portion 55 pivoted at 56 to a bifurcated link 57, to which is secured a rod 58. This rod 58 is necked at 59 so that in the vertical position of the steering handle 26 in Fig. 3, the neck portion 59 is between the faces 49a of the brake shoes 49. That portion of the rod 58 below the neck portion 59 is widened as at 60, so that if the rod 58 is moved vertically from the position of Fig. 3 by downward swinging movement of the handle 26, the widened portion 60 of the said rod will act to separate the brake shoes, as will be readily understood by those skilled in the art.

A suitable spring 61, best shown in Fig. 1, extends between the steering handle 26 and the main frame so as to maintain the handle in its position of Figs. 1 and 3 whenever the handle is not depressed manually. Therefore, should the operator let go of the handle, it will be swung to its vertical position and the brake applied, as has already been set forth.

The vertical swinging movement of the steering handle 26 is utilized not only for operating the brake, but for operating the controller C within the controller casing 28. Thus, on a post 62 through which is supported the casing of the motor 23, there is mounted for sliding movement a collar 63, to which is pivoted at 64 a vertical rod 65. At the other end of the collar there is pivoted at 66 the brake operating rod 58. The rod 65 extends into the controller casing 28 and is secured to what I term a contact block 67 which slides on rods 68 mounted within the casing 28. The contact block 67 has a contact carrying portion 69 formed of insulation material, and mounted thereon are copper contact members 70 and 71 of a type well known by those skilled in the art. A series of contact fingers 72, 73, 74 and 75 are adapted to close various circuits with the segments 70 and 71 when those segments are moved with the contact block 67 in an upwardly direction from the position of Fig. 3.

Movement in an upwardly direction is imparted to the contact block 67 by the rod 65, collar 63, and brake operating rod 58, through the downward swinging movement of the steering handle 26. When the steering handle 26 moves into the dot and dash position denoted by the indication "1st" in Figs. 3 and 6, a first speed circuit is closed. When the steering handle is moved into a position noted as "Inter," an intermediate speed circuit is closed, and thereafter a second speed circuit is closed. An overrun position, designated as "2nd Overrun" in Figs. 3 and 6, illustrates the movement which may be imparted to the steering handle from the second position to the second overrun position without moving the controller parts out of second speed position.

The several contact fingers 72, 73, 74 and 75 are suitably mounted on an insulation block 76 from which, through the usual type of binding posts, wires run to the various parts of the motor and battery. The details of construction of the controller need not be described more fully, it is thought, since those skilled in the art will find it quite clearly shown in the drawings, and since the wiring diagram will illustrate the relationship between the controller, the motor 23, and the battery.

Referring now more particularly to Fig. 6, I shall describe the manner in which the downward swinging movement of the steering handle 26 is adapted to operate the controller C to open and close the several speed circuits. It should first, however, be indicated that there are mounted on the end of the handle 26 a pair of push button switches designated F and R and representing "Forward" and "Reverse." It is the function of these switches to close what I term directional contactor circuits, thereby determining the direction of rotation of the traction motor and the traction wheels. Moreover, the closing of one of the push buttons F or R is a requisite to the closing of any speed circuit, since the speed circuits are controlled by contactors FC and RC, FC being the "Forward contactor" and RC being the "Reverse contactor."

Each of the contactors comprises a coil 77 and an armature 78. The armature 78 of the forward contactor is equipped with contacts 79 and 80, while the armature 78 of the reverse contactor is equipped with contacts 81 and 82. The armatures 78 are pivoted to the ends of a bar 83a, which in turn is centrally pivoted at 83b. It is obvious that when one of the contactor coils 77 is energized, its armature 78 will be moved in one direction forcing the armature 78 of the other coil in a reverse direction. Thus, if the coil 77 of the forward contactor is energized, the contact elements 79 and 80 will move against contacts 79a and 79b, 80a and 80b. Actuation of the reverse contactor effects the movement of contacts 81, 82 to bridge the contacts 81a and 81b, and 82a and 82b. Those skilled in the art will now appreciate that the push buttons F and R not only control the directional movement of the truck, but that they make it possible to stop the operation of the traction motor regardless of the position of the steering handle, should the operator wish to stop quickly in an emergency.

It is thought that it will be helpful to describe just what occurs in one cycle of operation of the controller. For describing such a cycle of operation, reference is made to the wiring diagram of Fig. 6. With the truck steering handle in the position shown in Fig. 6 and the truck stationary, should it be desired to move the truck rearwardly, the operator simply depresses the push button R. This closes a circuit through the wire 83, the coil 77 of the reverse contactor RC, contact 81a, and wire 84 to the minus side of the battery. The plus side of the battery is in communication with the push button R through the wire 85. The excitation of the reverse contactor bridges contacts 81a, 81b, and 82a and 82b, as is quite obvious, the lever 83a serving to lock the forward contactor against operation. With the parts as indicated, should the steering handle 26 be moved into what is indicated as first position in Fig. 6, the brake will be released and a circuit will be closed as follows: From the plus side of the battery through the wire 86, through the armature A of the motor 23, the wire 87 to contact 82a, through contact 82 to the contact 82b, wire 88, contact 72, wire 89, through the field F1 of the motor, wire 90, to the contact 74, then through the segment 70 of the controller to the contact 73, wire 91 to the field F2 of the motor 23, wire 92 to the contact 75, thence back to contact 81b, through the contact 81 to the contact 81a, and then through the wire 84 to the negative side of the battery.

The circuit thus described is one with the motor armature in series with both its fields F1 and F2. When the steering handle 26 is moved to what is indicated as an intermediate position, one of the fields is shunted, while with the steering handle 26 moved to its second or high speed position, both fields F1 and F2 are in parallel with the armature of the motor 23. It is thought unnecessary to lengthen the description by describing in detail the circuits when the controller is in its intermediate and in its second position, since those circuits will be quite clear to those skilled in the art, especially after the description already given.

It is, however, quite obvious that in any speed position, should the push button R be released, the contacts 81, 82 will be brought out of bridging relation to the contacts 81a, 81b and 82a, 82b so as to open any particular speed circuit of the motor. It is also quite obvious that the actuation of the forward push button F controls the closing of the forward circuits in the same manner as the operation of the push button R controls the closing of the reverse circuits. Those skilled in the art will also note that segments 70 and 71 of the controller are of such extent that the second speed circuit may be maintained during a considerable movement of the steering handle 26. This movement is well indicated by the brackets and the notations "2nd" in Fig. 6. The value of this construction will be well appreciated, it is thought, without further comment.

Referring now more particularly to Figs. 7, 8, 9 and 10, I illustrate in those figures a modified form of my invention in which the traction wheel is driven by a chain, rather than through gearing as in the first modification described. The controller operates in my second modification as in the first modification, except that it is located in a different position and is operated in a reverse direction. The brake operation of my second modification is somewhat different from that of the first modification in that the spring between the brake shoes normally urges the brake shoes away from braking position, the movement of the steering handle being utilized for maintaining the brake shoes in braking relation to the drum when the steering handle is moved into its vertical position. In addition, I show in Figs. 7–10, a modified form of clutch mechanism.

Referring now more particularly to Figs. 7–10, there is secured to the main frame of the truck, a bracket 100, an integral portion of the bracket designated by reference numeral 101 forming a circular bearing for the steering head. This steering head has a lower portion 102 and an upper portion 103 secured together by a series of bolts 104, as best indicated in Fig. 7. Through ball bearings 105 and 106, the two parts 102 and 103 of the steering head are maintained for rotation relatively to the steering head bearing 101. The lower portion 102 of the steering head terminates in forks 107, which through an axle 108 support a traction wheel 109. This traction wheel has bolted thereto a sprocket wheel 110, which through a drive chain 111, is moved to propel the truck. Mounted on the upper portion 103 of the steering head through suitable brackets, is a traction motor 112 whose drive shaft 113 carries a pinion 114. This pinion is in driving engagement with a gear 115 keyed to a countershaft 116, the countershaft being supported by bearings 117 and 118 relatively to a gear casing 119.

Keyed to the shaft 116 at 120 is what I term a driving flange 121 formed with a series of holes 122 adapted for the entry of pins 123 extending from a clutch member 124. This clutch member 124 is normally spring pressed by a spring 125 so that the pins 123 will lie within the holes 122 of the driving flange 121, and will extend through those holes into further holes 126 in a member 128. This member 128 is rotatably mounted on countershaft 116, and has sprocket teeth 127 formed thereon. It is also equipped with a brake drum portion 129. It is obvious that with the pins 123 in the position of Fig. 7, rotation of the countershaft 116 will effect the rotation of the driving flange 121 and the member 128. This will effect a rotation of the sprocket teeth 127 and the brake drum 129. The chain 111 is in engagement with the sprocket teeth 127, and is driven thereby to drive the traction wheel 109.

For disengaging the clutch, it is merely necessary to move the clutch member 124 against the pressure of spring 125, withdrawing the pins 123 from the holes 122 and 126. A slight rotation of the clutch will then bring the pins 123 opposite a series of shallow bores 130 in the drive flange, as shown in Fig. 8, so as to hold the pins 123 against any movement into driving engagement with the member 128. It will be noted that, as in the case of the first modification, the brake drum 129 is never out of functional engagement with the traction wheel 109, so that the brake may be applied at all times, regardless of the position of the clutch mechanism.

Referring now more particularly to Figs. 9 and 10, the steering handle in this modification, designated by reference numeral 131, is pivoted at 132 to the upper member 103 of the steering head. An adjustable bolt 133 extends from the lower end of the steering handle 131 toward a bell crank 134 pivoted as at 135 to the steering head. This bell crank 134 is in turn pivoted at 136 to a pair of levers 137, which in turn are pivoted to brake shoes 138. These brake shoes operate through brake lining 139 against the brake drum 129, it being the function of the steering handle 131, through the adjustable bolt 133, to move the bell crank 134 and force the brake shoes 138 against the spring 141 into braking contact with the brake drum. As in the first modification, a spring (which is not shown in Fig. 9) is utilized to maintain the steering handle in its vertical position. It is the force of this spring which will move the steering lever to actuate the brake shoes. It is obvious, however, that if greater pressure than may be brought to bear by the spring is required, as for a quick stop, the operator may exert his full force on the steering handle 131 to apply the brake. The adjustable stop bolt 142 is used for limiting the movement of the bell crank 134 in a release direction, as is obvious from Fig. 9. Other means could, of course, be provided.

The steering handle 131 has pivoted thereto at 143 a bifurcated link 144 which in turn is pivoted at 145 to a rod 146 which extends into the controller casing 147, best illustrated in Fig. 10. Mounted within this controller casing is a contact carrying block 148, on which are mounted segments 149 and 150 similar to the contact segments of the first modification. These segments cooperate with a series of spring contact members 151 when the rod 146 is moved by the steering handle. As was already indicated, the operation of the controller mechanism is exactly the same as in the first modification so that no further description thereof is herein necessary. Similarly, the relation between the brake mechanism and the controller is the same as in the first modification.

Referring now to Fig. 11, I show a modification of a form of the invention of Figs. 7–10, inclusive, but illustrating a pair of wheels driven by a chain, rather than the single wheel 109 of Fig. 7. In addition, in Fig. 11 the controller is shown in a raised vertical position somewhat similar to the position of the first modification described. Otherwise the parts are arranged in almost the same manner as in the modification of Figs. 7–10. For convenience, the same reference numerals are applied to the parts of Fig. 11 as in Figs. 7–10, inclusive, except where the parts differ.

In Fig. 11, the lower half 102 of the steering head is equipped with forks 107 which support, similarly to Fig. 7, a driving shaft 108, to which is keyed a sprocket 151 and the pair of wheels 152. The sprocket 151 is driven by a chain 111 from a sprocket 127 in the same manner as in the modification of Fig. 7. The clutch, the brake, and the other mechanisms in Fig. 11 are exactly the same in construction and operation as the parts of Figs. 7–10 and need not be described in further detail, those parts being shown quite clearly and designated by the same reference numerals as the parts in Figs. 7–10.

The controller in Fig. 11, designated by reference numeral 153, is operated by a rod 154 similar to the rod 146 of the modification of Figs. 7–10, and the rod 65 of the first modification, the rod 154 being actuated by a bifurcated lever 155 pivoted to a rod 156 which is secured to the steering handle 157 for moving the controller in a manner which is now quite apparent. I deem it quite unnecessary to venture into further details regarding this last modification.

I now claim:

1. In a truck of the class described, a traction motor, a controller for said traction motor having a movable circuit closing member for particularly conditioning a series of electric speed circuits through said motor, a steering head, a steering handle pivoted on said head for vertical swinging movement relatively to said head, means whereby vertical swinging movement of said handle moves said circuit closing member to condition said circuits, and manually operated means mounted on said steering handle for controlling the circuits conditioned by the vertical swinging movement of said handle.

2. In a truck of the class described, a traction motor, a controller for said traction motor, a steering head, a steering handle pivoted on said head for vertical swinging movement relatively to said head, means whereby vertical swinging movement of said handle operates said controller to close a speed circuit of said motor, a control circuit for said speed circuit, and a manually operated means on said handle for controlling said control circuit.

3. In a truck of the class described, a traction motor, a controller for said traction motor having a movable circuit closing member for closing an electric circuit through said traction motor, a handle pivoted on said truck for swinging movement, means whereby swinging movement of said handle moves said circuit closing member to close said electric circuit, a contactor circuit for controlling said electric circuit, and a manually operated switch for said contactor circuit mounted on said handle.

4. In a truck of the class described, a traction motor, a controller for said traction motor having a movable circuit closing member for closing an electric circuit through said traction motor, a steering head, a handle pivoted on said head for swinging movement, means whereby said swinging movement of said handle moves said circuit closing member to close said electric circuit, a control circuit for said electric circuit, means whereby the closing of said control circuit is requisite to the closing of said electric circuit, and a manually operated switch for closing said control circuit mounted on said handle.

5. In a truck of the class described, a traction motor, a controller for said traction motor having a movable circuit closing member for closing an electric circuit through said traction motor, a handle pivoted on said truck for swinging movement, means whereby swinging movement of said handle moves said circuit closing member to close said electric circuit, directional contactor circuits for said electric circuit, and manually operated switches for said directional contactor circuits mounted on said handle for ready manipulation.

6. In a truck of the class described, a traction motor, a controller for said traction motor having a movable circuit closing member for closing an electric speed circuit through said traction motor, a handle pivoted on said truck for swinging movement, means whereby swinging movement of said handle moves said circuit closing member to close said speed circuit, directional control circuits for said speed circuit, and manually operated switches for said directional control circuits mounted on said handle for ready manipulation.

7. In a truck of the class described, a traction motor, a controller for said traction motor having a movable circuit closing member for closing an electric speed circuit through said motor, a steering head, a steering handle pivoted on said head for vertical swinging movement relatively to said head, means whereby vertical swinging movement of said handle moves said circuit closing member to close said speed circuit, directional contactor circuits for said speed circuit, and manually operated switches on said handle for effecting the closing of one or the other of said directional contactor circuits.

8. In a truck of the class described, a traction motor, a controller for said traction motor having a movable circuit closing member for closing electric speed circuits through said traction motor, a steering head, a steering handle pivoted on said steering head for vertical swinging movement, means whereby swinging movement of said handle moves said circuit closing member to close said speed circuits, a contactor circuit for said speed circuits the closing of which is a requisite to the closing of said speed circuits, and a manually operated switch for said contactor circuit mounted on said handle for ready manual manipulation.

9. In a truck of the class described, a traction motor, a controller for said traction motor, a steering head, a steering handle pivoted on said steering head, mechanical means secured at one end to said controller and at the other end to said steering handle whereby the vertical swinging movement of said handle moves said controller, a control circuit the closing of which is a requisite to the actuation of said traction motor, and a switch for closing said control circuit mounted on said steering handle for ready manipulation.

10. In a truck of the class described, a traction motor, a traction wheel, mechanical means through which rotaiton of said traction motor transmits rotation to said traction wheel, a rotary member forming a part of said mechanical means separate from said motor and mechanically located between said motor and said traction wheel, a brake drum on said rotary member, brake shoes for said drum, a controller for said motor, a steering head, a steering handle pivoted on said head for vertical swinging movement, and means whereby said handle when swung from a vertical towards a horizontal position moves said controller to actuate said traction motor while releasing said brake shoes from said brake drum.

11. In a truck of the class described, a traction motor, a traction wheel, mechanical means through which rotation of said traction motor transmits rotation to said traction wheel, a rotary member forming a part of said mechanical means, a releasable clutch between said motor and said rotary member, a brake drum on said member, brake shoes for said drum, a controller for said motor, a steering head, a steering handle pivoted on said head for vertical swinging movement, and means whereby said handle when swung from a vertical towards a horizontal position moves said controller to actuate said traction motor and effects the release of said drum from said brake shoes.

12. In a truck of the class described, a traction motor, a controller for said traction motor having a movable circuit closing member for closing an electric speed circuit through said traction motor, a steering head, a steering handle pivoted on said head for swinging movement, means whereby said swinging movement of said handle moves said circuit closing member to close said speed circuit, forward and rearward directional circuits for said speed circuit to determine the direction of rotation of said traction motor, switches for closing one or the other of said directional circuits mounted on said handle, and means whereby said circuits are interlocked so that but one directional circuit may be closed at one time.

13. In a truck of the class described, a traction motor, a controller for said traction motor having a movable contact movable into engagement with a stationary contact for closing a speed circuit, a steering head, a steering handle pivoted on said head, means of connection between said steering handle and said movable contact whereby vertical upward and downward swinging of said handle moves said movable contact relatively to said stationary contact, one of said contacts being of substantial effective area so that said contacts may move for a considerable distance relatively to one another incidental to a substantial vertical swinging of said handle, while maintaining closed said speed circuit.

14. In a truck of the class described, a traction motor, a traction wheel, mechanical means through which rotation of said traction motor transmits rotation to said traction wheel, a rotary member forming a part of said mechanical means, a brake drum on said member, brake shoes for said drum, a steering head, a steering handle pivoted on said head for vertical swinging movement, means whereby said handle when swung from a horizontal towards a vertical position effects the application of said brake shoes to said drum, and a readily releasable clutch between said traction motor and said rotary member whereby said traction motor may be disengaged relatively to said traction wheel without interfering with the braking of said traction wheel.

15. In a truck of the class described, a steering head, a traction motor on said steering head, a traction and steering wheel supporting said steering head, mechanical means through which rotation of said traction motor transmits rotation to said traction wheel, a brake drum for said traction wheel, brake shoes for said drum, a steering handle pivoted on said steering head for vertical swinging movement, means whereby said handle when swung vertically effects the release of said drum from said brake shoes, and a readily releasable clutch between portions of said mechanical means whereby said traction motor may be disengaged relatively to said traction wheel and its brake without interfering with the control of said traction wheel by said brake.

16. In a truck of the class described, a steering head, a steering and traction wheel mounted on said head, a traction motor mounted on said head, mechanical means through which rotation of said traction motor transmits rotation to said traction wheel, a rotary member forming a part of said mechanical means, a brake drum on said member, brake shoes for said drum, a controller for said motor, a steering handle pivoted on said steering head for vertical swinging movement, means whereby said handle when swung from a vertical towards a horizontal position moves said controller to actuate said traction motor and effects the release of said drum from said brake shoes, and a readily releasable clutch between said traction motor and said rotary member whereby said traction motor may be disengaged relatively to said traction wheel.

17. In a truck of the class described, a steering head, a steering handle mounted for vertical swinging movement on said steering head, an electric traction motor for said truck, means movable with said steering handle as it swings for opening and closing a switch in an electric circuit for said traction motor, and manually operated means on said steering handle for opening and closing additional switches in said electric circuit.

18. In a truck of the class described, a steering head, a steering handle mounted for vertical swinging movement on said steering head, an electric traction motor for said truck, means movable with said steering handle as it swings for opening and closing a switch in an electric circuit for said traction motor, directional control circuits for said electric circuit, and manually operated means on said steering handle for opening and closing said directional control circuits.

19. In a truck of the class described, an electric motor for propelling said truck, a circuit for said electric motor having two control points, both of which must be particularly conditioned before said circuit is closed, a steering handle for said truck pivotally mounted thereon for vertical swinging movement, means whereby said steering handle so particularly conditions said circuit at one of said control points when said steering handle is swung from a vertical toward a horizontal position, and manually operated means on said steering handle for particularly conditioning said circuit at the other of said control points.

20. In a truck of the class described, an electric motor for propelling said truck, an electric circuit the conditioning of which controls the running and speed of said motor, a steering handle for said truck pivotally mounted for vertical swinging movement on said truck, means for controlling said electric motor circuit operated by swinging movement of said steering handle and positioned to condition said electric motor circuit to stop said motor when said steering handle is in its vertical zone, said means effecting the conditioning of said electric circuit when said steering handle moves toward a horizontal position whereby said motor is in first speed, said means conditioning said electric circuit when said steering handle is swung even further toward a horizontal position so that said motor is in second speed, and manually operated means on said steering handle the movement of which to a predetermined position is a requisite to the conditioning of said circuit for operation of said motor.

21. In a truck of the class described, an electric motor for propelling said truck, an electric circuit the conditioning of which controls the running and speed of said motor, a steering handle for said truck pivotally mounted for vertical swinging movement on said truck, means for controlling said electric motor circuit operated by swinging movement of said steering handle and positioned to condition said electric motor circuit to stop said motor when said steering handle is in its vertical zone, said means effecting the conditioning of said electric circuit when said steering handle moves toward a horizontal position whereby said motor is in first speed, said means conditioning said electric circuit when said steering handle is swung even further toward a horizontal position so that said motor is in second speed, directional control circuits for the said electric circuit, and manually operated means on said steering handle for controlling said directional control circuits.

22. In a truck of the class described, an electric motor for propelling said truck, a source of electric power for said motor, a steering handle for said truck pivotally mounted for vertical swinging movement on said truck, switch means for said electric motor operated by swinging movement of said steering handle and positioned to maintain said electric motor out of contact with said electric power source when said steering handle is in its vertical zone, said switch means effecting the connection of said motor to said power means when said steering handle is swung toward a horizontal position, and a second switch means at the handle end of said steering lever the movement of which to a predetermined position is a requisite to the closing of said circuit between said power source and motor by said first switch means.

23. In a truck of the class described, an electric motor for propelling said truck, a source of electric power for said motor, a steering handle for said truck pivotally mounted for vertical swinging movement on said truck, switch means for said electric motor operated by swinging movement of said steering handle and positioned to maintain said electric motor out of contact with said electric power source when said steering handle is in its vertical zone, said switch means effecting the connection of said motor to said power means when said steering handle is swung toward a horizontal position, a pair of directional circuits for determining in which direction current will flow from said power source through said motor, and circuit closing means for said directional circuits mounted for manual operation on said steering handle.

24. In a truck of the class described, a traction motor, a controller for said traction motor, a steering head, a steering handle pivoted on said steering head for vertical swinging movement, means movable with said handle as it swings on its pivot for operating said controller to start and stop said motor, and manually operated means mounted on said steering handle for determining the direction of operation of said motor.

HERBERT J. FRAMHEIN.